United States Patent
Lee et al.

(10) Patent No.: US 11,010,365 B2
(45) Date of Patent: May 18, 2021

(54) MISSING VALUE IMPUTATION USING ADAPTIVE ORDERING AND CLUSTERING ANALYSIS

(71) Applicant: International Business Machines Corporation, Armonk, NY (US)

(72) Inventors: Sunhwan Lee, San Mateo, CA (US); Lingtao Cao, Hayward, CA (US); Sarah E. Knoop, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 415 days.

(21) Appl. No.: 15/939,521

(22) Filed: Mar. 29, 2018

(65) Prior Publication Data
US 2019/0303471 A1    Oct. 3, 2019

(51) Int. Cl.
| | | |
|---|---|---|
| *H04L 29/08* | (2006.01) | |
| *G06F 16/23* | (2019.01) | |
| *G06F 16/28* | (2019.01) | |
| *G06F 16/9535* | (2019.01) | |
| *G06T 11/20* | (2006.01) | |

(52) U.S. Cl.
CPC ........ *G06F 16/2365* (2019.01); *G06F 16/285* (2019.01); *G06F 16/9535* (2019.01); *G06T 11/206* (2013.01); *H04L 67/12* (2013.01)

(58) Field of Classification Search
CPC .............................. G06F 16/2365; H04L 67/12
See application file for complete search history.

(56) References Cited

U.S. PATENT DOCUMENTS

| | | | |
|---|---|---|---|
| 8,843,423 B2 | 9/2014 | Chu et al. | |
| 2009/0222472 A1* | 9/2009 | Aggarwal | G06F 16/24556 |
| 2010/0057651 A1* | 3/2010 | Fung | G06N 7/005 |
| | | | 706/12 |
| 2011/0071956 A1* | 3/2011 | Pinto | G06Q 10/067 |
| | | | 705/348 |
| 2011/0105852 A1* | 5/2011 | Morris | G16H 50/30 |
| | | | 600/300 |

(Continued)

OTHER PUBLICATIONS

Shichao Zhang, et al., Missing Value Imputation Based on Data Clustering, Transactions on Computational Science I, LNCS, vol. 4750, 2008, pp. 128-138, Springer-Verlag Berlin Heidelberg, USA.

(Continued)

*Primary Examiner* — Van H Oberly
(74) *Attorney, Agent, or Firm* — Richard A. Wilhelm

(57) ABSTRACT

As received, a data value of an expected input set of received data values is missing from user input. A subset of known data with data values similar to a subset of the received data values is determined. A data sample average for the missing data value is determined from data values within the subset of the known data. An initial estimate of the missing data value is initialized using the data sample average. Boundary data clusters near the initial estimate of the missing data value are identified within the subset of the known data. A data harvesting region encapsulated according to the boundary clusters is defined. Data support clusters within at least one subset of the known data inside the data harvesting region are selected. The initial estimate of the missing data value is updated based upon data of the boundary clusters and the data support clusters.

17 Claims, 9 Drawing Sheets

(56) References Cited

U.S. PATENT DOCUMENTS

| | | |
|---|---|---|
| 2012/0136896 A1 | 5/2012 | Tseng et al. |
| 2015/0088907 A1* | 3/2015 | Li .................... G06F 16/24554 |
| | | 707/749 |
| 2015/0261846 A1 | 9/2015 | Hall et al. |

OTHER PUBLICATIONS

Nadia Solaro, et al., A Sequential Distance-Based Approach for Imputing Missing Data: Forward Imputation, Advances in Data Analysis and Classification, vol. 11, Issue 2, Mar. 2016, pp. 395-414, Springer-Verlag Berlin Heidelberg, USA.

B. M. Patil, et al., Missing Value Imputation Based on K-Mean Clustering with Weighted Distance, In Proceedings of the International Conference on Contemporary Computing, 2010, (Abstract only) pp. 1-5, Springer-Verlag Berlin Heidelberg, USA.

Qiankun Zhao, et al., HICCUP: Hierarchical Clustering Based Value Imputation using Heterogeneous Gene Expression Microarray Datasets, In Proceedings of the International Conference on Bioinformatics and Bioengineering, Nov. 5, 2007, (Abstract only) pp. 1-2, IEEE, Boston, MA, USA.

* cited by examiner

600

602 — RECEIVE, IN USER INPUT, DATA VALUES OF AN EXPECTED INPUT SET OF DATA VALUES, WHERE AT LEAST ONE DATA VALUE OF THE EXPECTED INPUT SET OF DATA VALUES IS MISSING FROM THE USER INPUT

604 — IMPUTE EACH OF THE AT LEAST ONE MISSING DATA VALUE

606 — DETERMINE AT LEAST ONE SUBSET OF KNOWN DATA WITH DATA VALUES SIMILAR TO AT LEAST A SUBSET OF THE RECEIVED DATA VALUES

608 — DETERMINE, FROM DATA VALUES ASSOCIATED WITH THE MISSING DATA VALUE WITHIN THE AT LEAST ONE SUBSET OF THE KNOWN DATA, A DATA SAMPLE AVERAGE FOR THE MISSING DATA VALUE

610 — INITIALIZE, USING THE DETERMINED DATA SAMPLE AVERAGE, AN INITIAL ESTIMATE OF THE MISSING DATA VALUE

612 — IDENTIFY, WITHIN THE AT LEAST ONE SUBSET OF THE KNOWN DATA, A PLURALITY OF BOUNDARY DATA CLUSTERS NEAR THE INITIAL ESTIMATE OF THE MISSING DATA VALUE

614 — DEFINE A DATA HARVESTING REGION ENCAPSULATED ACCORDING TO THE PLURALITY OF BOUNDARY DATA CLUSTERS

616 — SELECT MULTIPLE DATA SUPPORT CLUSTERS WITHIN THE AT LEAST ONE SUBSET OF THE KNOWN DATA INSIDE THE DEFINED DATA HARVESTING REGION

618 — UPDATE THE INITIAL ESTIMATE OF THE MISSING DATA VALUE BASED UPON DATA OF THE PLURALITY OF BOUNDARY DATA CLUSTERS AND THE SELECTED MULTIPLE DATA SUPPORT CLUSTERS

FIG. 6

MISSING VALUE IMPUTATION USING ADAPTIVE ORDERING AND CLUSTERING ANALYSIS

BACKGROUND

The present invention relates to computational derivation of missing data values. More particularly, the present invention relates to missing value imputation using adaptive ordering and clustering analysis.

Data collection processes often involve a person being presented with a questionnaire, and that person being requested to answer questions presented within the questionnaire. For example, health care, insurance, and other industries utilize data collection processes as part of an initial interaction to build information with which to initiate providing a particular service or product and/or to evaluate how to provide the particular service or product.

SUMMARY

A computer-implemented method includes, by a data collection interface processor that adaptively imputes missing data values based on data clustering responsive to user input via an operatively-coupled user input device: receiving, in the user input, data values of an expected input set of data values, where at least one data value of the expected input set of data values is missing from the user input; and imputing each of the at least one missing data value by, for each missing data value: determining at least one subset of known data with data values similar to at least a subset of the received data values; determining, from data values associated with the missing data value within the at least one subset of the known data, a data sample average for the missing data value; initializing, using the determined data sample average, an initial estimate of the missing data value; identifying, within the at least one subset of the known data, a plurality of boundary data clusters near the initial estimate of the missing data value; defining a data harvesting region encapsulated according to the plurality of boundary data clusters; selecting multiple data support clusters within the at least one subset of the known data inside the defined data harvesting region; and updating the initial estimate of the missing data value based upon data of the plurality of boundary data clusters and the selected multiple data support clusters.

A system that performs this optional computer-implemented method and a computer program product that causes a computer to perform the optional computer-implemented method are also described.

BRIEF DESCRIPTION OF THE DRAWINGS

FIG. 6 is a flow chart of an example of an implementation of a process for missing value imputation using adaptive ordering and clustering analysis according to an embodiment of the present subject matter;

DETAILED DESCRIPTION

Figure 1:
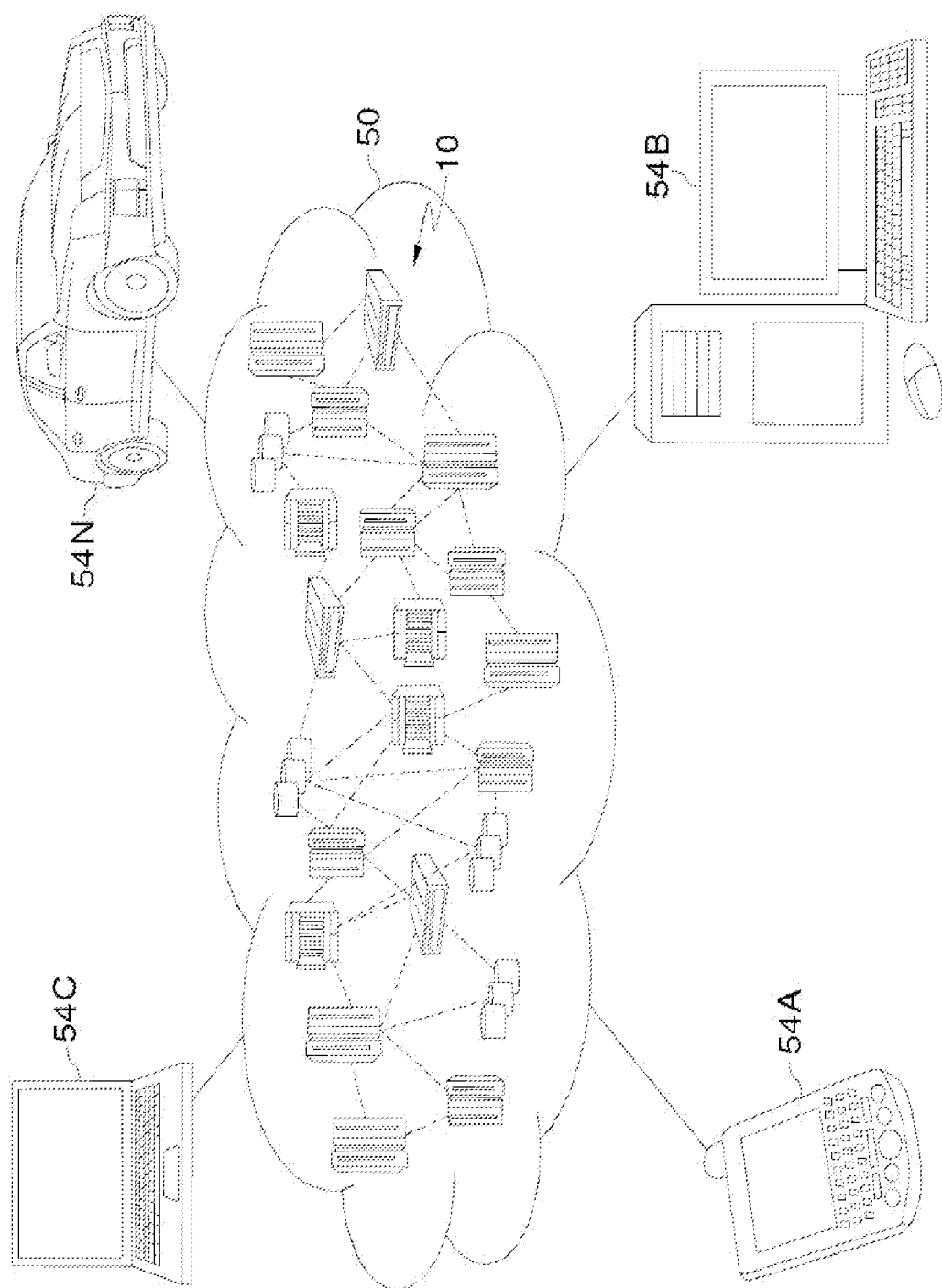
FIG. 1 depicts a cloud computing environment according to an embodiment of the present invention.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides missing value imputation using adaptive ordering and clustering analysis. The present technology solves a recognized data collection error and missing data problem by providing technology that includes a new form of computing device that improves computational processing within complex data collection and data analytics computing environments. The present technology improves computational capabilities of computers by use of scalable adaptive ordering and clustering analysis techniques to create a computer and/or computing platform that supports both categorical and continuous data values with a single data model. By providing support for both categorical and continuous data values with a single data model, the technology described herein advances computing technology by reducing complexity of conventional computer modeling techniques and processes. As a result of the technological advances and reduced model complexity described herein, a computing device that implements the technology described herein may perform more efficiently than conventional computing devices, may compute missing data values more rapidly than conventional computing devices, and may compute missing data values more accurately than conventional computing devices.

Two aspects of technical computing platform improvement that are provided by the technology and described herein are: (i) improved scalability of programmatic processing, and (ii) reduced variance (improved accuracy) of the resulting data output that is generated by the programmatic processing. Each of these technical improvements will be elaborated upon to provide a foundation for understanding of the technical details that follow and how these technical details improve computer performance and computational accuracy of computers.

Regarding improved scalability, in contrast to conventional model-based imputation method(s) that require construction of a number of (multiple) predictive models equal in number to a number of features in a given data set, the technology described herein uses one (1) model to impute missing values across a data set in an iterative way. In short, the conventional model-based method has the complexity O(n), where the number "n" is the number of features in a data set. In contrast, the technology described herein has complexity O(1). Further, the conventional approach required a computer to load and manipulate the designated number of constructed predictive models, which involved the associated processor, memory, and system bus operating loads to perform the required tasks across multiple models. In contrast, the technology described herein may load the single model once without having to load different models or provide different processing to account for differences among the different models. As a result, this foundational technological difference provided by the technology described herein improves not only the rate at which the computational processing may be performed, but improves the computational processing of the computing platform itself because of the underlying difference(s) and improvement in the way data modeling is implemented and applied by a computer.

Regarding reduced variance, in contrast to a conventional clustering-based approach that utilized individual clusters around the respective individual features to be imputed (again on the order of O(n) complexity), the technology described herein may generate more accurate imputation of missing data values by inferring the missing data values using multiple clusters. By selecting an appropriate ensemble/set of clusters to be utilized for missing value imputation of any given feature, the variance of the estimation provided by the computing technology described herein may be reduced and as a result more accurate computational imputation of a given missing value may be achieved. As a result, this foundational difference in the way the data modeling is implemented and applied by a computer also improves computational processing of the computing platform itself because of the underlying difference(s) and improvement in the selection of data from which to impute missing values and because of the improvement in computational accuracy of the results achieved.

In view of the technological advancements described above and in more detail below, the computational technology described herein provides far more than merely collecting, analyzing, and displaying data; and provides far more than other tasks for which conventional computers were used. In contrast, the computational technology described herein improves the accuracy of imputation of new data values that were not provided within a given data set, and does so with improved speed. Accordingly, the technology described herein provides significantly more in the area of technological computing advancement than was provided by conventional computing devices. Because of the scale and complexity of the computing data model and multiple data clusters that are applied to the computing data model to perform the computations described herein, advanced computing devices are needed to implement and manipulate the data modeling and imputation of missing data values described herein.

Some terminology used in describing some embodiments of the present subject matter will now be explained. "Imputation" of a missing data value is hereby defined as the process of estimating missing values in a dataset. Missing value imputation may be performed as described herein to complete a set of data that has one or more missing data elements, and to complete that data set with a high degree of confidence. The missing data value imputation as described herein ensures that the data set has been completed in a manner that provides improved computational processing of data sets that would otherwise not be capable of being processed with any level of confidence because of the missing data values. "Adaptive ordering" is hereby defined as a method of iteratively sorting items according to a previously-ordered collection of items. Adaptive ordering as described herein refers to improved and more rapid computer processing relative to conventional random sorting. "Clustering analysis" is hereby defined as a method to analyze data by grouping the analyzed data based on similarity of data items to one other. Clustering analysis as described herein refers to improved and more rapid computer processing relative to conventional technologies, such as batch analysis.

A "categorical data value" is hereby defined as data whose value is discrete. Categorical data values are used by computers to describe datasets whose values are each discrete (e.g., name, address, phone number, date, etc.). A "continuous data value" is hereby defined as data whose value may be represented as a floating point number (e.g., 1.02, etc.). Continuous data values are used by computers to describe datasets whose values may be represented using floating point numbers (e.g., weight such as 150.3 pounds, height such as 5.9 feet, etc.).

A "model" or a "predictive model" is/are hereby defined as a mathematical hypothesis or function that takes various features as inputs and generates a prediction for one or more target variables. Models are used as described herein to represent an underlying hypothesis within a computing platform to allow programmatic processing of various data changes, and as used herein assist with programmatic processing to impute missing data values. "Scalability" refers to a computational capability to apply a particular (single) predictive model to a variable number of data elements. Scalability as described herein allows a computer to perform more efficiently, more quickly, and more accurately to impute missing data values because the same model may be used to process multiple different missing data values, thereby reducing model retrieval time and model configuration time, with a contemporaneous increase in computer processing capabilities and computer processing speed.

A "centroid" of a data cluster is hereby defined as one point within a range of the various cluster elements that provides a minimum sum of distances from all cluster elements (e.g., points) in the data cluster, and may be considered an indicator of centrality or focus of the cluster elements, while not being itself an actual element of the data cluster. A centroid of a data support cluster as utilized and described herein results in improved computer processing of data clusters because derivation of and use of the centroid of the data cluster for predictive modeling is much more rapid than applying a predictive model to each individual cluster element in the data cluster. A "confidence interval" is hereby defined as a range of data values defined such that there is a specified probability that a value of an estimated parameter lies within the range of data values. Confidence intervals as described herein refer to a range of values utilized for estimating a missing data value to identify boundary clusters that when utilized improve real-time processing and data imputation accuracy of the technology described herein.

A "boundary cluster," alternatively termed a "boundary data cluster," is hereby defined as group of data whose centroid is closest to an edge of a given confidence interval. Boundary clusters as described herein refer to a specific group of data that when utilized as described herein result in improved computer processing to identify a boundary region encapsulated by centroids of data clusters that are nearest the extents of the specified confidence interval. By allowing centroids of data clusters outside of the boundary region to be omitted from computational processing, a rate at which a computed predictive result may be derived within the confidence interval is increased. A "data support cluster" of "support cluster" is hereby defined as a group of data contained within a boundary region other than the boundary clusters that are used with the boundary clusters for estimating a missing data value. Data support clusters as described herein refer to a set of data points that are within a boundary established by boundary clusters. When the support clusters are utilized as described herein improved computer processing to estimate the missing data values results because using the data points represented by centroids of support clusters results in a more scalable approach relative to conventional processing of building a separate predictive model for each feature for which missing values are to be estimated.

A "population" of support clusters is hereby defined as all data points included in a set of data support clusters. A population of support clusters as described herein refer to data in clusters that when utilized as described herein result in improved computer processing because a summary statistic of the given population of data support clusters is used to update the estimation of a missing data value, leading to more rapid computer convergence of computer predictions. A "data harvesting region" is hereby defined as a multi-dimensional area that has data points utilized for estimation, and may be defined with any number of dimensions appropriate for the particular set of data. A data harvesting region as described herein refers to an area containing data points that when utilized as described herein results in improved computer processing by increasing a rate at which imputed missing data values may be predicted. A "rectangular data harvesting region" is hereby defined as a two-dimensional (2D) area that is defined by connecting, for each dimension, maximum and minimum points of centroids of boundary clusters that form a perimeter of a confidence region to be used for imputation of missing data values. A rectangular data harvesting region as described herein refers to rectangular region containing data points that when utilized as described herein results in improved computer processing to impute a missing data value because the rectangular harvesting region eliminates the conventional process of building a predictive model for each feature that has missing values to be imputed.

"Uncertainty-based selection" is hereby defined as selecting features based on the confidence level of estimating the value of features in a decreasing order of variance of a feature's population mean. Uncertainty-based selection as described herein refers to processing to initialize a proposed algorithm by selecting a feature to estimate according to a particular order, which results in improved computer processing speed and thereby represents an available option by which to initialize and improve the missing value imputation. A "next largest uncertainty missing data value selection process" is hereby defined as selecting a next feature to impute by applying uncertainty-based selection iteratively, such that uncertainty across the data set is reduced with each iteration (e.g., certainty is increased with each iteration). A next largest uncertainty missing data value selection process as described herein refers a technique by which data imputation of missing data values may be sequentially ordered according to the respective decreasing degree of certainty such that when utilized as described herein results in improved computer processing and the speed by which to select the next feature to impute. "Cross-table frequencies" are hereby defined as a computer-based technique by which to calculate correlation scores between one or more pairs of unknown features. Cross-table frequencies as described herein refer to a technique by which to select a next question that has been identified as having a missing data value (e.g., a missing answer) to impute, and represent a cross examination of all features in a given data set for each entity represented (e.g., for each user that answered questions) within a frequency matrix of users and user answers. As such, cross-table frequencies represent a technical approach by which to implement the next largest uncertainty missing data value selection process, as described in more detail below.

A "population statistic" is hereby defined as numeric value representative of a set of data elements a population, such as mean and median, computed for all data elements in the set. A population statistic as described herein refers to a data value of a specified data type of missing data that when utilized as described herein results in improved computer processing to initialize the prediction of a missing value by reducing programmatic processing of each individual data element of the set of data elements.

The technology described herein operates by adaptively imputing missing data values based on data clustering responsive to user input via an operatively-coupled user input device. Data values of an expected input set of data values are received in the user input and at least one data value of the expected input set of data values is missing from the user input. Each of the at least one missing data value is imputed. At least one subset of known data with data values similar to at least a subset of the received data values is determined. A data sample average is determined for the missing data value using data values associated with the missing data value within the at least one subset of the known data. An initial estimate of the missing data value is initialized/picked using the determined data sample average. A set of boundary data clusters is identified near the initial estimate of the missing data value within the at least one subset of the known data. A data harvesting region encapsulated according to the set of boundary data clusters is defined. Multiple data support clusters within the at least one subset of the known data inside the defined data harvesting region are selected. The initial estimate of the missing data value is updated based upon data of the set of boundary data clusters and the selected multiple data support clusters.

It should be noted that conception of the present subject matter resulted from recognition of certain limitations and programmatic processing problems with computers that are associated with missing data values in sets of collected data for which the computers are programmed to process. For example, it was observed that missing data creates a computational problem when conducting computational data analysis because the missing data results in an incomplete data set and a conventional computer is unable to process the data set as a result. Missing data issues may occur for a variety of reasons, such as data being omitted during an initial or subsequent data collection process. The healthcare and insurance industries are examples of industry sectors that were recognized to suffer from computational problems that arise from missing data, though many other industry sectors may also suffer from computational problems that arise from missing data and the description herein applies to any such industry sector. Within the healthcare industry for purposes of example, healthcare data collected from patients tends to have many missing values, either because there are often too many questions for which patients do not know the answers or because there are questions which the patients decline to answer (e.g., for privacy or other reasons). It was further observed that many healthcare related computing applications require collection of data from patients to provide services, and that as a result of missing data values in the sets of data received from patients these healthcare related computers and computing applications suffer from poor data quality and/or may be rendered inoperative for their intended purpose(s).

While the healthcare related data provides a foundational example of the computing problems solved herein, the computing technology described herein may be applied to any type of information set and/or business domain for which missing data creates a problem. For example, missing data may create a problem within the insurance industry while performing processing for underwriting insurance policies, and for any other industries that rely upon data collection processes that may result in missing data.

To solve the missing data value problems, the computing technology described herein provides a computational approach that improves both computer functionality and data quality. It was determined that improving computer processing of sets of data that have missing data values may be initialized by use of and may be based upon the actual input data that was obtained (e.g., a subset of the intended/requested data). An initial decision (e.g., inference or prediction) regarding a particular course of action may be made based upon the actual input data that has been collected to initialize the processing described herein, and any missing data value(s) may be imputed with improved computational accuracy and speed as described herein based upon the actual input data that has been collected.

Referring again to the healthcare industry for purposes of example, to computationally predict the outcome of a specific treatment accurately, it was determined that the missing data values need to be imputed more accurately, more rapidly, and more efficiently to improve the input data quality and the real-time performance of treatment analysis. It was further determined that conventional model-based imputation method(s) that require construction of a number of predictive models equal in number to a number of features in a given data set (on the order of O(n) where "n" is the number of features in the data set) are inefficient and waste both real-time computing resources (e.g., processor cycles) and computer storage resources (e.g., memory, hard disk or other storage, etc.). It was determined that development of a single (one (1)) model upon which to base computer processing for imputation of missing data values, with that single model applied in an iterative way, may allow that single model to be retained in computer memory and processed more rapidly. Use of a single model may avoid consuming computer resources, while contemporaneously increasing real-time performance and accuracy for missing data value imputation.

Use of a single model as described herein also provides more scalability than use of the conventional multi-model approach. For example, conventional multi-model solutions utilize a supervised machine learning approach that is not scalable because the number of models required to be constructed grows exponentially with respect to the number of subsets of features to be evaluated in a particular data set.

In contrast to the conventional multi-model approach(es), the technology described herein applies clustering analytics using the single model to impute the remaining missing data values across a data set, which results in a scalable approach that is adaptable across diverse quantities of sets of features to be evaluated. The technology described herein is also capable of handling complex computations for both categorical data values and continuous data values with use of a single model. To further improve the computational rate at which missing values may be imputed, components of the technology described herein may be applied to an adaptive data collection process that operates during data collection to minimize the impact of missing values during the data collection, which may thereby further improve real-time computational performance and accuracy of imputed data values.

The present subject matter improves missing data value imputation by providing for missing value imputation using adaptive ordering and clustering analysis, as described above and in more detail below. As such, improved computer performance and missing data value imputation accuracy may be obtained through use of the present technology.

To elaborate on certain details of the missing value imputation using adaptive ordering and clustering analysis described herein, and again using the healthcare industry for purposes of example, it may be presumed that certain baseline information may be considered available for a given population of patients and usable for identification of data support clusters. For example, it may be presumed that a set of features may be predominant and usable for identification of clustering for use in support of analytics, such as a set of baseline information (e.g., age, gender, height, weight, body mass index (BMI), current use of antibiotics, whether the patient was ever a smoker, known anemia, or other information that may be available across a given population of patients).

Regarding initial inputs to establish a baseline for missing data value imputation using adaptive ordering and clustering analysis, initial clustering results within a complete data set that includes coordinates of centroids of clusters of the input data may be provided. A population mean (e.g., average) of the respective features (given the respective ages, genders, BMI's, etc.) may be established.

With the input baseline information established, a set of features provided by a new patient during data collection may be received for processing, where the selected subset of features that form the data support clusters may be considered as primary input data to be received in the input data set from the new patient (e.g., age, gender, and BMI may be considered required, though other features may also be provided). It is understood that certain other information that is omitted from the input data set may be imputed by use of the technology described herein, and an estimated (imputed) data value along with a confidence interval for the imputed data values of any missing features may be outputted. The imputed data values and confidence interval may serve as input for additional processing to identify one or more treatment alternatives, both more quickly and more accurately than may be performed using conventional technologies.

The missing value imputation using adaptive ordering and clustering analysis described herein may be performed in real time to allow prompt imputation of missing data values. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

Additional details of the algorithmic processing and computational efficiencies will be provided further below. The following portion of the present description provides examples of advanced computational platform(s) within which the present technology may be implemented, followed by further details of the missing value imputation using adaptive ordering and clustering analysis described herein.

It should be noted that the present technology may be implemented within or as part of a cloud computing environment (e.g., for data analytics), or may be implemented as a customized environment-specific solution. As such, examples of implementations for both environments are included herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
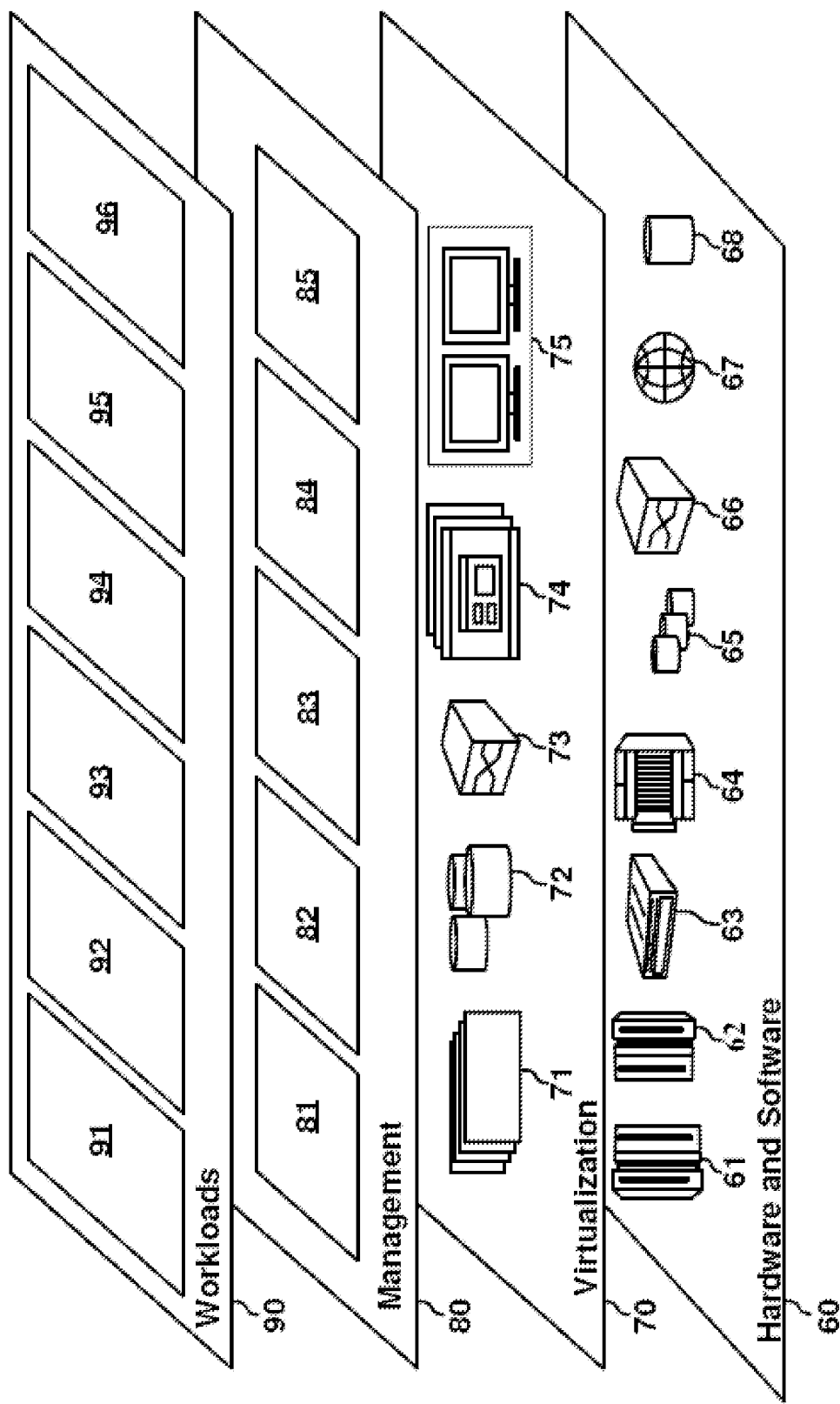
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and missing value imputation using adaptive ordering and clustering analysis (MVI-AOCA) 96.

Regarding alternative implementation options, FIGS. 3 and 4 below are directed to such alternatives of a customized environment-specific computing solution. It should be understood that the various alternatives may be combined with or substituted with the implementation options described above, as appropriate for the given implementation.

Figure 3:
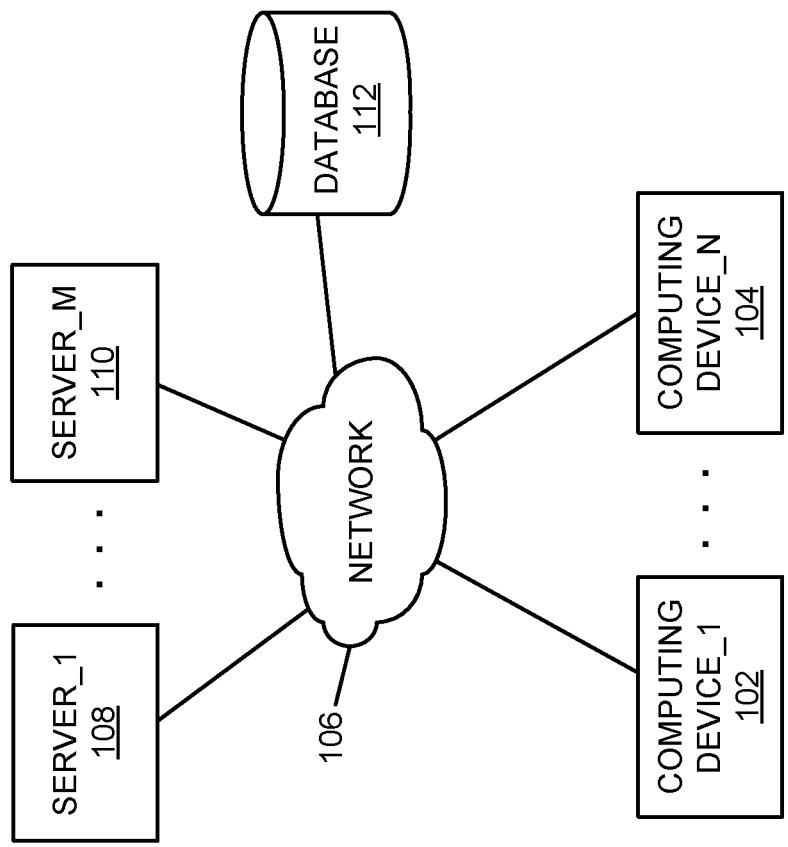
FIG. 3 is a block diagram of an example of an implementation of a system for missing value imputation using adaptive ordering and clustering analysis according to an embodiment of the present subject matter.

FIG. 3 is a block diagram of an example of an implementation of an alternative system 100 for missing value imputation using adaptive ordering and clustering analysis.

A computing device_1 102 through a computing device_N 104 communicate via a network 106 with several other devices. The other devices include a server_1 108 through a server_M 110. A database 112 provides shared storage within the system 100.

It should be understood that any of the computing device_1 102 through the computing device_N 104 and/or the server_1 108 through the server_M 110 may provide automated missing value imputation using adaptive ordering and clustering analysis, either alone or as collaborating computing devices. The missing value imputation using adaptive ordering and clustering analysis is based upon improved modeling and algorithmic processing to increase both performance and accuracy of missing value imputation.

In view of the implementation alternatives described above, the present technology may be implemented within a cloud computing platform, at a user computing device, at a server device level, or by a combination of such platforms and devices as appropriate for a given implementation. A variety of possibilities exist for implementation of the present subject matter, and all such possibilities are considered within the scope of the present subject matter.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The server_1 108 through the server_M 110 may include any device capable of providing data for consumption by a device, such as the computing device_1 102 through the computing device_N 104, via a network, such as the network 106. As such, the server_1 108 through the server_M 110 may each include a web server, application server, or other data server device.

The database 112 may include a relational database, an object database, or any other storage type of device. As such, the database 112 may be implemented as appropriate for a given implementation.

Figure 4:
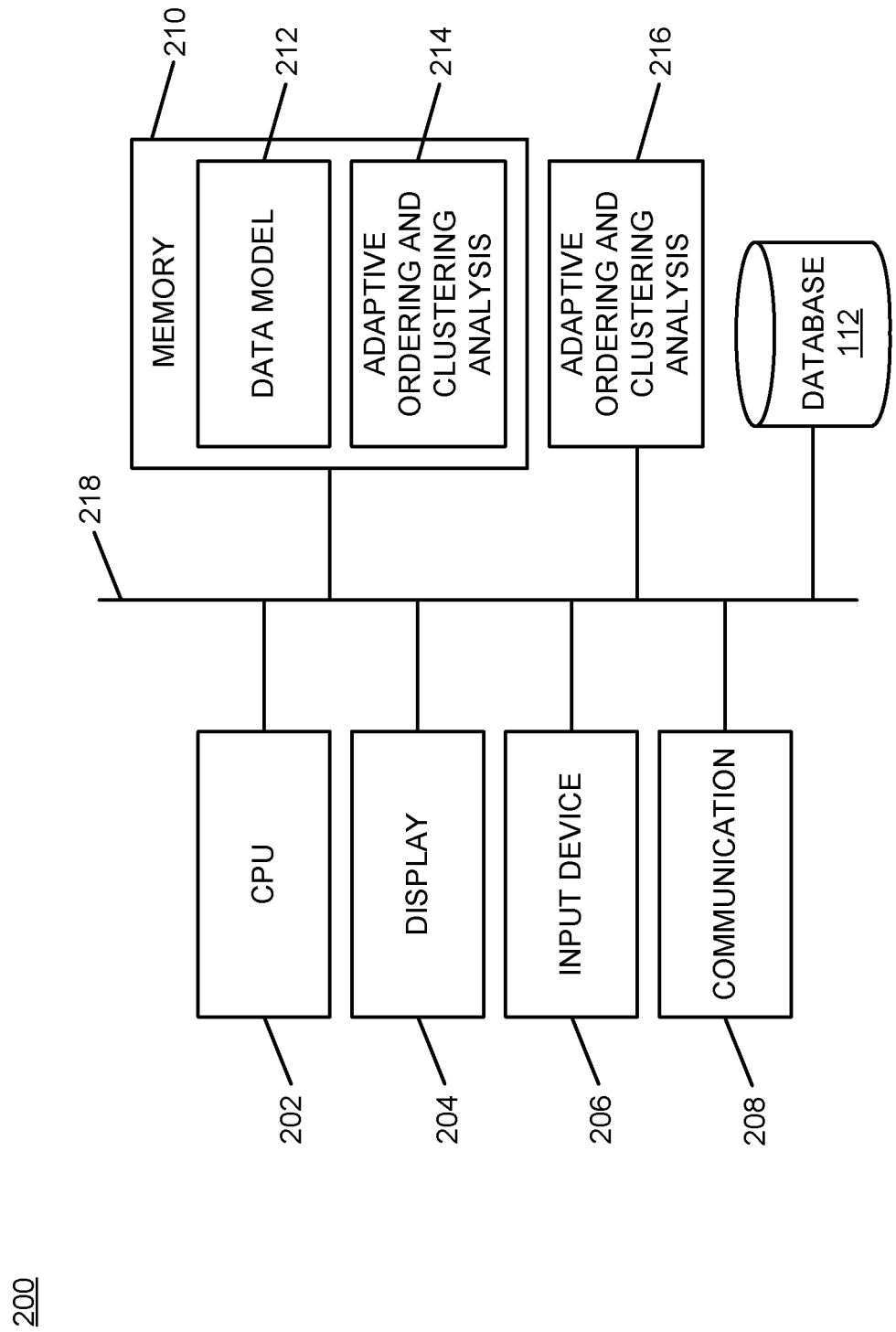
FIG. 4 is a block diagram of an example of an implementation of a core processing module capable of performing missing value imputation using adaptive ordering and clustering analysis according to an embodiment of the present subject matter.

FIG. 4 is a block diagram of an example of an implementation of a core processing module 200 capable of performing missing value imputation using adaptive ordering and clustering analysis. The core processing module 200 may be associated with either the computing device_1 102 through the computing device_N 104 or with the server_1 108 through the server_M 110, or with devices within the cloud computing environment 50, as appropriate for a given implementation. As such, the core processing module 200 is described generally herein, though it is understood that many variations on implementation of the components within the core processing module 200 are possible and all such variations are within the scope of the present subject matter. Additionally, the core processing module 200 may be implemented as an embedded processing device with circuitry designed specifically to perform the processing described herein as appropriate for a given implementation.

Further, the core processing module 200 may provide different and complementary processing of imputation of missing data values in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 ("processor") provides hardware that performs computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, voice command processing unit, or any other type of input device by which the user may interact with and respond to information on the display 204.

It should be noted that the display 204 and the input device 206 may be optional components for the core processing module 200 for certain implementations/devices, or may be located remotely from the respective devices and hosted by another computing device that is in communication with the respective devices. Accordingly, the core processing module 200 may operate as a completely automated embedded device without direct user configurability or feedback. However, the core processing module 200 may also provide user feedback and configurability via the display 204 and the input device 206, respectively, as appropriate for a given implementation.

A communication module 208 provides hardware, protocol stack processing, and interconnection capabilities that allow the core processing module 200 to communicate with other modules within the system 100. The communication module 208 may include any electrical, protocol, and protocol conversion capabilities useable to provide interconnection capabilities, as appropriate for a given implementation. As such, the communication module 208 represents a communication device capable of carrying out communications with other devices.

A memory 210 includes a data model storage area 212 that stores a missing data value imputation model for use by the core processing module 200. The memory 210 also includes an adaptive ordering and clustering analysis storage area 214. As will be described in more detail below, the adaptive ordering and clustering analysis storage area 214 may store input and derived (newly-created) data values to be applied to the missing data value imputation model stored within the data model storage area 212, and may store output of data imputation processing that may include one or more imputed data values and confidence intervals for the imputed data values of any missing features in the respective data set.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

An adaptive ordering and clustering analysis module 216 is also illustrated. The adaptive ordering and clustering analysis module 216 provides programmatic processing for the core processing module 200, as described above and in more detail below. The adaptive ordering and clustering analysis module 216 implements the automated missing value imputation using adaptive ordering and clustering analysis of the core processing module 200.

It should also be noted that the adaptive ordering and clustering analysis module 216 may form a portion of other circuitry described without departure from the scope of the present subject matter. The adaptive ordering and clustering analysis module 216 may form a portion of an interrupt service routine (ISR), a portion of an operating system, or a portion of an application without departure from the scope of the present subject matter. The adaptive ordering and clustering analysis module 216 may also include an embedded device with circuitry designed specifically to perform the processing described herein as appropriate for a given implementation.

The database 112 is again shown within FIG. 4 associated with the core processing module 200. As such, the database 112 may be operatively coupled to the core processing module 200 without use of network connectivity, as appropriate for a given implementation.

The CPU 202, the display 204, the input device 206, the communication module 208, the memory 210, the adaptive ordering and clustering analysis module 216, and the database 112 are interconnected via an interconnection 218. The interconnection 218 may include a system bus, a network, or any other interconnection capable of providing the respective components with suitable interconnection for the respective purpose.

Though the different modules illustrated within FIG. 4 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. Many other possible arrangements for components of the core processing module 200 are possible and all are considered within the scope of the present subject matter. It should also be understood that, though the database 112 is illustrated as a separate component for purposes of example, the information stored within the database 112 may also/alternatively be stored within the memory 210 without departure from the scope of the present subject matter. Accordingly, the core processing module 200 may take many forms and may be associated with many platforms.

FIG. 5A through FIG. 8 described below represent example diagrams and example processes that may be executed by devices, such as the core processing module 200, to perform the automated missing value imputation using adaptive ordering and clustering analysis associated with the present subject matter. Many other variations on the example diagrams and processes are possible and all are considered within the scope of the present subject matter. The example processes may be performed by modules, such as the adaptive ordering and clustering analysis module 216 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

Figure 5A:
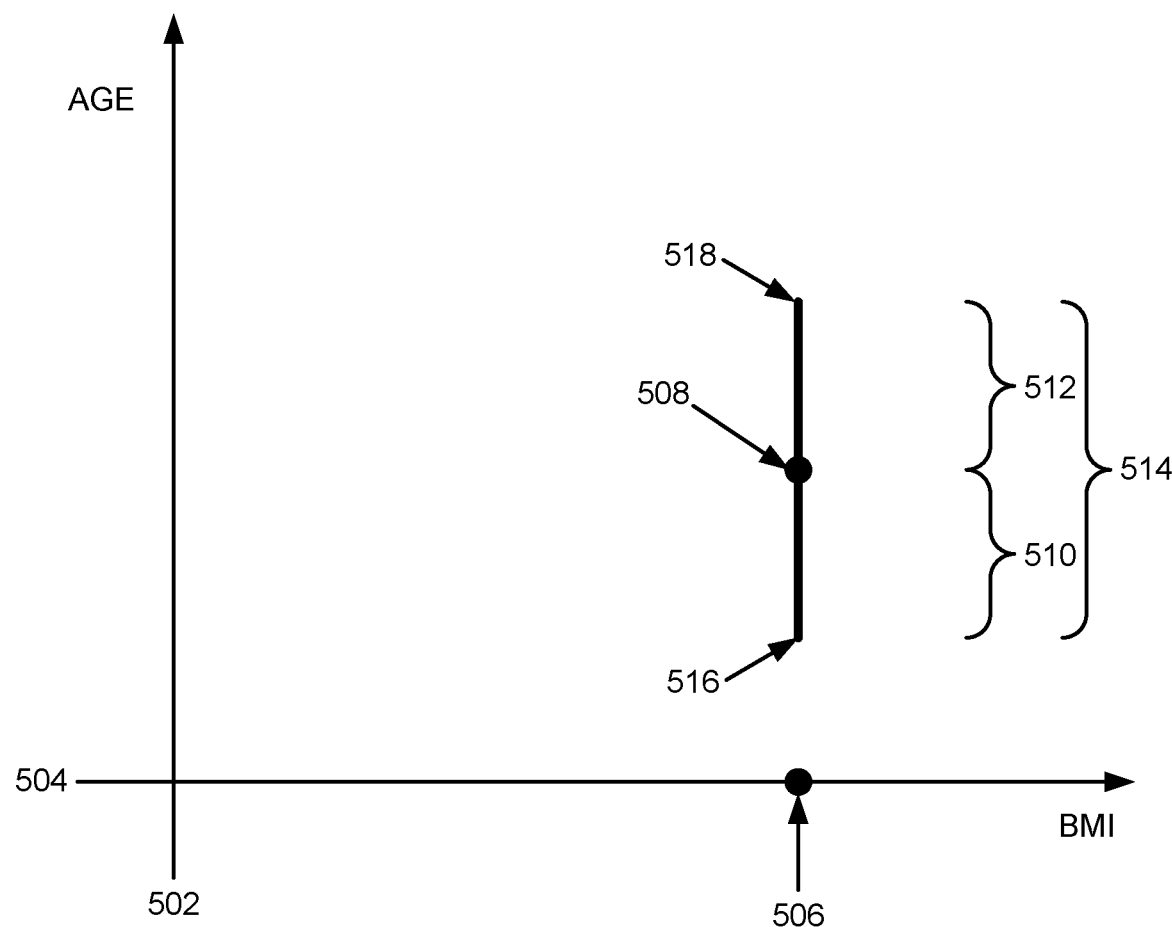
FIG. 5A is a diagram of an example of an implementation of initial technical data processing for missing value imputation using adaptive ordering and clustering analysis using one two-dimensional (2D) data set according to an embodiment of the present subject matter.
Figure 5B:
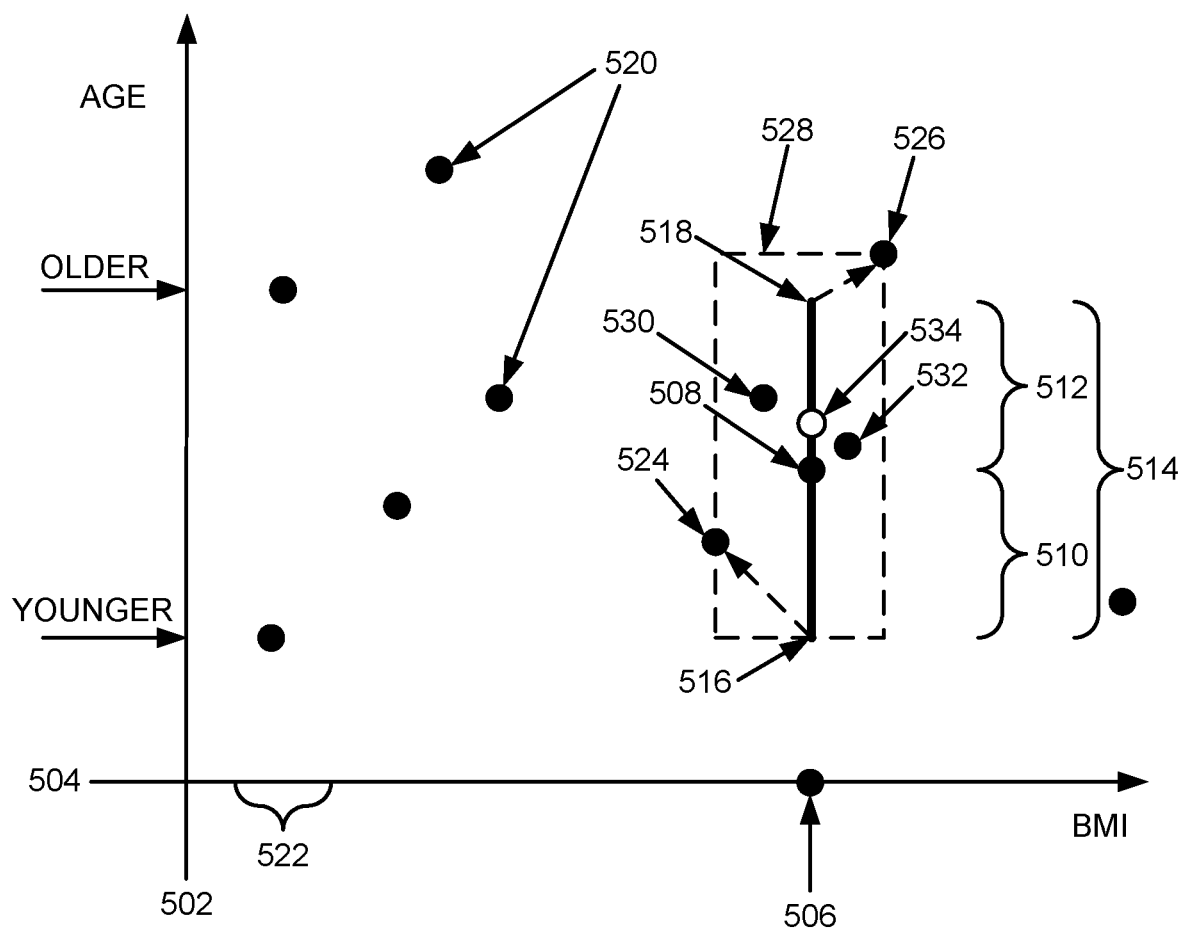
FIG. 5B is a diagram of an example of an implementation of additional technical data processing for missing value imputation using adaptive ordering and clustering analysis using the two-dimensional (2D) data set of FIG. 5A according to an embodiment of the present subject matter.

FIGS. 5A-5B are diagrams of an example of an implementation of technical data processing for missing value imputation using adaptive ordering and clustering analysis described herein using one two-dimensional (2D) data set by way of an example 500. FIG. 5A illustrates initial detailed processing of initial inputs for missing value imputation using adaptive ordering and clustering analysis, while FIG. 5B illustrates additional detailed processing for missing value imputation using adaptive ordering and clustering analysis.

The example 500 represents a computer-implemented example of performing processing to identify coordinates of centroids of data clusters across a given population. The coordinates of the centroids of the data clusters across the given population may be derived from previously-gathered known (complete) data sets. By use of previous known data sets to derive the coordinates of the centroids, the data of these coordinates of centroids of data clusters across a given population are usable to perform the missing data value imputation with improved confidence of accuracy for a data set that has one or more missing data values. The processing described herein may be applied across multi-variable data sets to impute multiple missing data values. The example 500 utilizes two variables to clarify the technical processing performed, with the understanding that multi-dimensional processing may be performed using one of the advanced computing platforms/systems described above.

FIG. 5A illustrates initial processing of the example 500 and illustrates a two-dimensional (2D) grid to be utilized across a given population for two variables, which are age and body mass index (BMI) within the present example. It is understood that BMI may be calculated from a given person's height and weight, and as such BMI is a compound variable. As can be seen from FIG. 5A, the variable "age" is represented along a vertical axis 502, while the variable "BMI" is represented along a horizontal axis 504.

For purposes of the present description, it is presumed that a new patient has been provided with a questionnaire, and certain data values are missing from the resulting data set due to the patient not answering one or more questions. The processing to obtain answers from the patient may be interactive using adaptive ordering of the questions. Alternatively, a data set of answers (with one or more missing data values) may be post-processed after several of the questions have been answered with adaptive ordering to select which missing value to impute in a sequence such that the resulting imputed missing values have increasing accuracy based upon known data/answers and previously imputed missing values.

For purposes of the present example, is further presumed that the BMI of the patient is known, but that the patient's age is not known. Within the present example, the patient's known BMI 506 is depicted along the horizontal axis 504.

Given the patient's known BMI 506, the technical processing for missing value imputation using adaptive ordering and clustering analysis described herein may begin by determining a data average or other statistical mean or data point across the known population of known data values for age(s) of individuals with the BMI 506. FIG. 5A illustrates an initial estimation of age 508 that may be specified based upon such a data average or other statistical mean or data point for the new patient. This initial estimation of age 508 may be used as described herein as an initial input to the processing described herein to improve upon the initial estimation of age 508.

The technology described herein proceeds by determining a statistical variation or statistical uncertainty associated with the initial estimation of age 508. This statistical variation is represented by a variation range 510 below the initial estimation of age 508 and a variation range 512 above the initial estimation of age 508. It should be noted that while the present example illustrates the variation range 510 and the variation range 512 to be generally equivalent, this need not be the case because any given statistical measure may have a different resulting uncertainty in different directions relative to a particular estimate. A combination of the variation range 510 and the variation range 512 yields a confidence interval 514 for the initial estimation of age 508 relative to the vertical axis 502.

This confidence interval 514 may be utilized, as described in more detail in association with FIG. 5B, to leverage other known data across the population to improve accuracy and a rate of calculation of an imputed data value of the unknown age of the patient. Specifically, a bottom end 516 of the confidence interval 514 and a top end 518 of the confidence interval 514 will be used to select additional known data to be used to impute the missing age of the patient.

FIG. 5B illustrates additional processing of the example 500 and depicts centroids of data clusters of known ages relative to known BMI values across the given population for the two variables BMI and age. A collection of centroids of known data clusters 520 are illustrated within FIG. 5B by enclosed circles (e.g., dots). Arrows from the reference designator 520 are illustrated to specifically identify two (2) of the collection of centroids of data clusters 520, while additional arrows are omitted from FIG. 5B to avoid crowding in the drawing. However, for purposes of the present description, it is understood that all of the enclosed circles form the complete known collection of centroids of known data clusters 520 for the two represented variables across the given population. Specific numbers and ranges of BMI and age are omitted to focus on the technological processing details of the subject matter described herein.

Within the collection of centroids of data clusters 520, it can be seen that different BMI values correlate with different centroids of data clusters for age across the population. As can also be seen, within a horizontal region 522 depicted along the horizontal axis 504, both younger and older persons may have a relatively low BMI relative to other portions of the population. As can be seen from this portion of the example, it may be very difficult using conventional technologies to arrive at an imputed value of age from BMI. While this provides one working example, similar analysis may be applied to other centroids of the collection of centroids of data clusters 520. The technology described herein may be leveraged to impute data values with confidence in view of the new computational techniques that are described herein.

Using the collection of centroids of data clusters 520 as an additional initial known data set, the processing to calculate an imputed age value for the patient to fill in the unknown data point may continue. Processing includes taking as additional input each of the patient's BMI 506 as illustrated along the horizontal axis 504, and the confidence interval 514 of the initial estimation of age 508 relative to the vertical axis 502. The bottom end 516 of the confidence interval 514 and the top end 518 of the confidence interval 514 may now be used to select additional known data to be used to impute the missing age of the patient.

Using ends 516 and 518 of the confidence interval 514, individual ones of the centroids of data clusters 520 may be identified as boundary clusters. For purposes of the present description, boundary clusters represent the closest extents/distances of centroids of known data from the ends 516 and 518 of the confidence interval 514. Using the ends 516 and 518 of the confidence interval 514, centroids of known data clusters that are further from the confidence interval 514, while still being close (proximate to) the confidence interval 514 may be selected from the particular set of known data.

As can be seen from FIG. 5B, a boundary cluster 524 and a boundary cluster 526 have been identified using dashed-line arrows to be the closest centroids of data clusters 520 to the respective bottom end 516 and top end 518 of the confidence interval 514. These boundary clusters 524 and 526 may now be used to define a boundary region 528 that encapsulates the confidence interval 514, while expanding the set of centroids of known data clusters that may be used to impute the missing data value (e.g., age in this example). The boundary region 528 represents a data harvesting region and is shown with a dashed line for clarity within FIG. 5B.

As can be seen from FIG. 5B, the boundary region 528 fully encompasses the entire confidence interval 514. It can further be seen that a left edge of the boundary region 528 passes directly through the boundary cluster 524, and that a right edge of the boundary region 528 passes directly through the boundary cluster 526.

Further, because the closest boundary cluster 526 to the top end 518 of the confidence interval 514 is higher (in the 2D space) than the top end 518 of the confidence interval 514, a top edge of the boundary region 528 also passes directly through the boundary cluster 526. As such, because the boundary cluster 526 is further in each dimension from the top end 518 of the confidence interval 514, the boundary cluster 526 defines the extents of the boundary region 528 in both dimensions.

However, as can also be seen from FIG. 5B, the boundary cluster 524 is further (higher) from the horizontal axis 504 than the bottom end 516 of the confidence interval 514. Accordingly, to ensure that the boundary region 528 fully encapsulates the confidence interval 514, the bottom end 516 of the confidence interval 514 is selected as the bottom edge of the boundary region 528. As such, the boundary region 528 is defined to fully encapsulate the confidence interval, while expanding the set of centroids of known data clusters 520 that may be used to impute the missing data value (e.g., age in this example).

The boundary clusters 524 and 526 provide two initial centroids of known data clusters, and these clusters may be added to the set of centroids of known data clusters to be used to impute the missing data value. The boundary region 528 determines an area from which to select centroids of additional data clusters that may be used to impute missing data values. Clusters inside the boundary region 528 are termed "support clusters" or "data support clusters."

As can be seen from FIG. 5B, two additional centroids of known data clusters of known data values are within the boundary region 528. Specifically, a data support cluster 530 and a data support cluster 532 may be selected as data support clusters because they are located within the boundary region 528. These additional data support clusters 530 and 532 may also be added to the set of centroids of known data clusters to be used to impute the missing data value.

This set of centroids of known data clusters may then be utilized in combination with the initial estimate as additional known data points to use to impute the missing data value of interest (e.g., age in this example) with a configured degree of certainty. The calculation may involve one or more of a majority vote, an average, a comparison with a population mean/average, or other calculations as appropriate for a given implementation.

For purposes of the present example, an imputed age data value 534 is illustrated as a hollow circle, and shows that the initial estimation of age 508 has been improved according to the processing performed using the technology described herein. The processing described herein may be iteratively applied across a set of unknown data values, either during a data intake session as missing values are recognized in association with data input processing or offline during post-intake data processing. Example processing for adaptive ordering is described below in association with FIG. 8.

The present technology improves computational processing accuracy and speed in recognition of the fact that centroids of data clusters outside of the boundary region 528 have less relevance and thereby less utility for purposes of imputing missing data values. The technology described herein omits these centroids of data clusters outside of the boundary region 528 from processing. By limiting the data clusters that are utilized for purposes of calculating the missing data value, processing speed may be increased relative to conventional computing technology because of the focused (smaller and more confident) set of data that is processed in association with the centroids of known data clusters relative to the confidence interval 514. Further, by using the focused set of data, the technology described herein provides a high degree of accuracy, while significantly reducing processing overhead to arrive at predicted values of missing data. As such, both the predictive accuracy and processing speed of the technology described herein may be increased relative to conventional computing technology. The technology described herein improves both processing speed and accuracy of calculated data values of missing data within data sets.

Once the imputed value of age is calculated, the processing described above may be iteratively applied to other missing data values (e.g., to impute the missing value of height from a known value of weight, etc.). Other known data sets may be selected and applied as described above, to utilize one known data value to identify boundary clusters that delineate a boundary region, and to identify data support clusters. The next unknown data value may be imputed, and the processing may continue as described above to impute the next missing data value. This iterative processing may be performed in real time during data collection (e.g., using a web form or other user interface), or may be performed in real time across a set of collected data.

FIG. 6 is a flow chart of an example of an implementation of a process 600 for missing value imputation using adaptive ordering and clustering analysis. The process 600 represents a computer-implemented method of performing the missing data value imputation described herein. At block 602, the process 600 receives, in user input, data values of an expected input set of data values, where at least one data value of the expected input set of data values is missing from the user input. At block 604, the process 600 imputes each of the at least one missing data value. At block 606, the process 600 determines at least one subset of known data with data values similar to at least a subset of the received data values. At block 608, the process 600 determines, from data values associated with the missing data value within the at least one subset of the known data, a data sample average for the missing data value. At block 610, the process 600 initializes, using the determined data sample average, an initial estimate of the missing data value. At block 612, the process 600 identifies, within the at least one subset of the known data, a plurality of boundary data clusters near the initial estimate of the missing data value. At block 614, the process 600 defines a data harvesting region encapsulated according to the plurality of boundary data clusters. At block 616, the process 600 selects multiple data support clusters within the at least one subset of the known data inside the defined data harvesting region. At block 618, the process 600 updates the initial estimate of the missing data value based upon data of the plurality of boundary data clusters and the selected multiple data support clusters.

Figure 7:
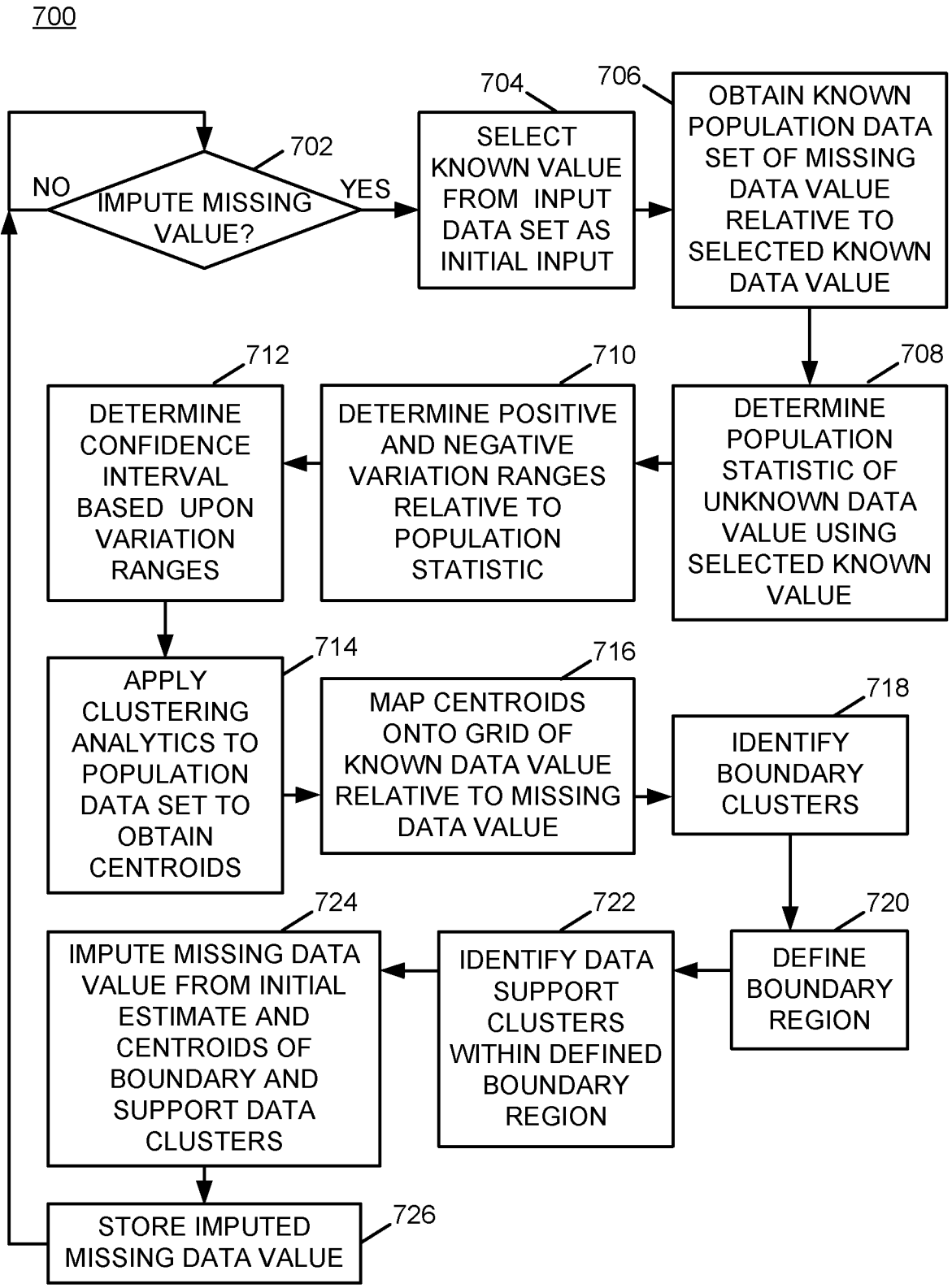
FIG. 7 is a flow chart of an example of an implementation of a process that performs additional detailed processing that may be utilized for missing value imputation using adaptive ordering and clustering analysis according to an embodiment of the present subject matter.

FIG. 7 is a flow chart of an example of an implementation of a process 700 that performs additional detailed processing that may be utilized for missing value imputation using adaptive ordering and clustering analysis. The process 700 represents a more detailed computer-implemented method of performing the missing value imputation described herein. At decision point 702, the process 700 makes a determination as to whether to impute a missing data value.

Figure 8:
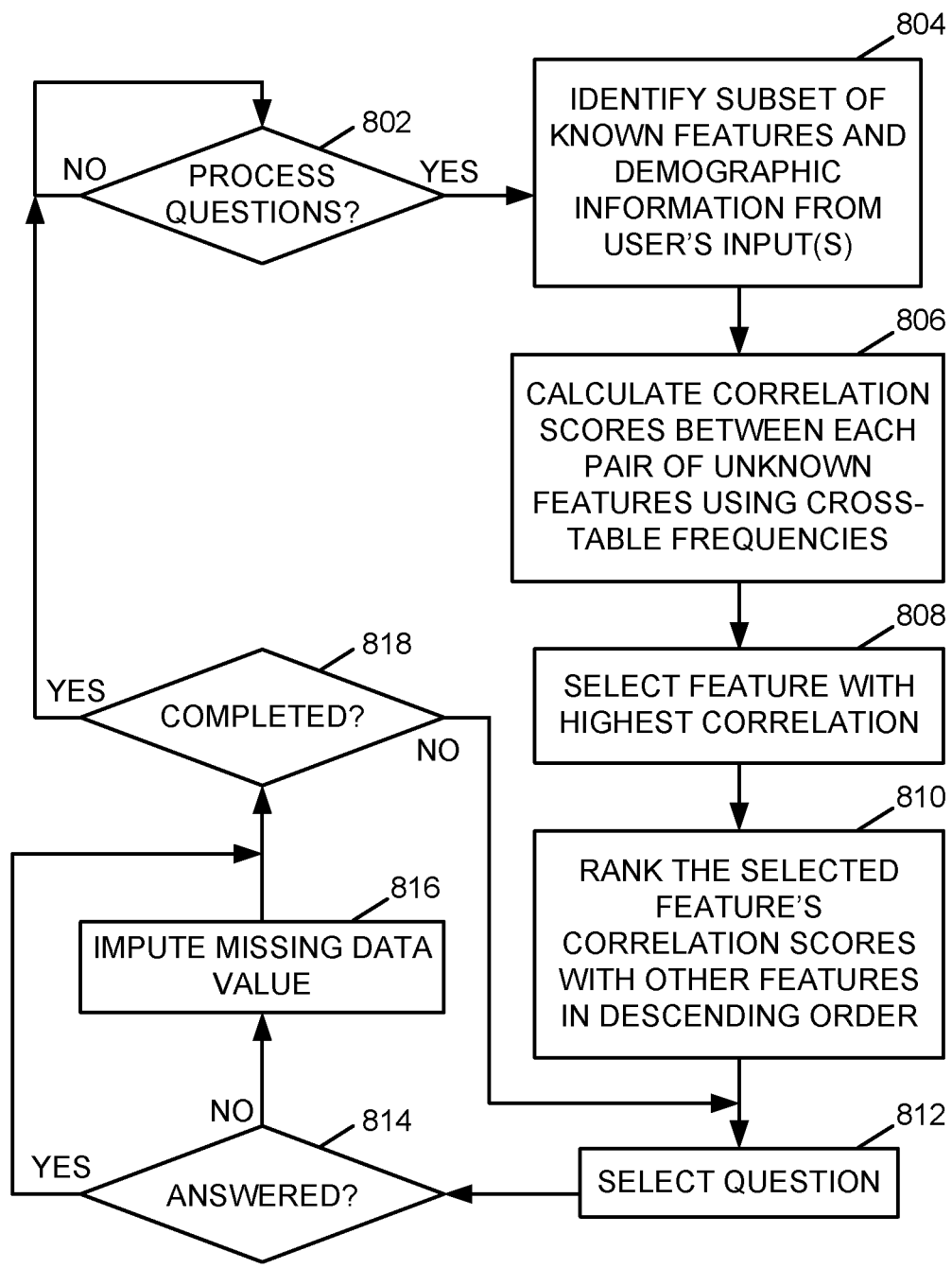
FIG. 8 is a flow chart of an example of an implementation of a process for missing value imputation using adaptive ordering and clustering analysis that includes detailed processing for example adaptive ordering of questions according to an embodiment of the present subject matter.

The process 700 may be performed in an iterative and/or interactive manner. It is presumed that at least one data value is missing from a data set and that the missing data value(s) is/are to be imputed. Additionally, as described above and in more detail below, imputation of a data value may be performed across a set of previously-collected data or in real time in conjunction with adaptive ordering of questions. FIG. 8 below illustrates processing for example adaptive ordering of questions. It is understood that the process 700 may be integrated into and form a portion of the processing described in association with FIG. 8, as appropriate for a given implementation. It should be further understood that the process 700 may be iteratively performed in a re-entrant or non-re-entrant manner, again as appropriate for the given implementation.

In response to determining at decision point 702 to impute a missing data value, the process 700 selects a known data value from an input data set as initial input at block 704. With reference to the example 500 described above, a value such as a patient's known body mass index (BMI) may be selected as the known value, and a value of "age" may be considered to be the unknown data value to be imputed. However, any other known data value may be selected as appropriate for a given implementation and any other unknown data value may be selected for imputation, as appropriate for a given implementation. The remainder of the description of the process 700 presumes, for purposes of example, that BMI is the known data value, and age is the unknown data value to be imputed.

At block 706, the process 700 obtains a known population data set of the missing data value relative to the selected known data value. Again, a known population of age data values across a population of persons having a BMI equivalent to the known BMI may be obtained.

At block 708, the process 700 determines a population statistic of the unknown data value using the selected known data value as an initial estimate of age. For example, a data average or other statistical mean or data point across the known population of data values for age of individuals with the BMI may be obtained.

At block 710, the process 700 determines a positive variation range and a negative variation range relative to the population statistic represented in the initial estimate of age. As such, the process 700 determines a statistical variation or statistical uncertainty associated with the initial estimation of age. As described further above, the positive variation range and the negative variation range may be equivalent or may be different, as appropriate for a given implementation.

At block 712, the process 700 determines a confidence interval based upon the positive and negative variation ranges. This confidence interval may be utilized to leverage other known data across the population to improve accuracy and a rate of calculation of an imputed data value of the unknown age of the patient.

At block 714, the process 700 applies clustering analytics to the population data set to obtain centroids of data clusters of known ages relative to known BMI values across the given population for the two variables BMI and age. As described above, within the collection of centroids of data clusters, different BMI values may correlate with different centroids of data clusters for age across the population.

At block 716, the process 700 maps the centroids of the data clusters onto a grid of the known data value (e.g., BMI) relative to the missing data value (e.g., age). As described above in association with the example 500, this grid may be represented as a graph. Further, this mapping of centroids of the data clusters onto the grid of the known data value relative to the missing data value allows for selection of additional data clusters relative to the bottom end of the confidence interval and the top end of the confidence interval to be used to improve accuracy and computation rate for imputing the missing data value.

At block 718, the process 700 identifies boundary clusters relative to the confidence interval. Boundary clusters represent the closest extents/distances of centroids of known data from the top and bottom ends of the confidence interval. These boundary clusters may be added to the set of centroids of known data clusters to be used to impute the missing data value.

At block 720, the process 700 defines a boundary region using the confidence interval and the selected boundary clusters. The boundary region represents a data harvesting region and may be defined such that it completely encapsulates the confidence interval. For example, where the confidence interval is defined as a vertical range relative to the selected vertical axis, horizontal boundaries may be defined relative to the ends of the confidence interval, while vertical boundaries may be defined relative to the centroids of the respective boundary clusters. Regarding the horizontal boundaries of the boundary region, because the boundary clusters may be located at different vertical extents relative to the ends of the confidence interval, either the respective end of the confidence interval or the respective boundary cluster closest to the respective end of the confidence interval may be selected as a horizontal boundary. Regarding the vertical boundaries of the boundary region, the centroids of the respective boundary clusters closest to the respective ends of the confidence interval may be selected as the vertical boundaries.

At block 722, the process 700 identifies data support clusters within the defined boundary region. These additional data support clusters may also be added to the set of centroids of known data clusters to be used to impute the missing data value.

At block 724, the process 700 imputes the missing data value from the initial estimate and centroids of the boundary and support clusters. As such, the data set used to impute the data value leverages the initial estimate, but additionally applies a technical approach to improve accuracy of the resulting imputed data value by use of the centroids of known data clusters across a population of known data. Again, the calculation may involve one or more of a majority vote, an average, a comparison with a population mean/average, or other calculations as appropriate for a given implementation.

At block 726, the process 700 stores the imputed missing data value as part of the data set. This imputed data value may be utilized in additional iterations of the process 700 to impute additional data values, thereby leveraging computer-implemented processing across very large data sets to improve both accuracy and speed of imputation of missing data values for these very large data sets. The process 700 returns to decision point 702, and iterates as described above.

As such, the process 700 selects a known data value from the data set, and determines a population statistic for the unknown data value as an initial estimate. The population statistic is adjusted across a range with positive and negative probabilistic variations to arrive at a probabilistic confidence interval. Centroids of surrounding data clusters are used to define a boundary region that fully encapsulates the probabilistic confidence interval, while providing additional centroids of known data clusters across the population. By leveraging these additional data points, the initial estimate may be refined to improve both the accuracy and speed of the computing platform at imputation of missing data values.

FIG. 8 is a flow chart of an example of an implementation of a process 800 for missing value imputation using adaptive ordering and clustering analysis that includes detailed processing for example adaptive ordering of questions. The process 800 represents a computer-implemented method of performing the adaptive ordering described herein. At decision point 802, the process 800 makes a determination as to whether to process questions and answers. It should be noted that the process 800 may be performed in real time to implement interactive question and answer sessions with a person, or may be performed in real time across a data set previously obtained that has one or more missing values to be imputed by the technical processing described herein.

In response to determining to process questions and answers, the process 800 identifies a subset of known features and demographic information from user input(s) at block 804. The subset of known features and demographic information may be derived in any manner appropriate for a given implementation. For purposes of example, a summary frequency table across a cohort of subjects is utilized.

At block 806, the process 800 calculates correlation scores between each pair of unknown features using cross-table frequencies. The use of cross-table frequencies provides improved imputation accuracy for subsequent imputed values, and improved technical data processing speed for selection of a next feature to impute. Specifically, cross-table frequencies represent a methodology that may be applied to select the next question that has a missing data value to be imputed by comparison and correlation of features across a frequency matrix. As described herein, two types of frequencies may be used. A first type of cross-table frequency method may include finding the feature that has the most (or least) occurrences in a given event by comparing the other features regardless of whether or not the outcome is known. A second type of cross-table frequency method may include finding the feature that has the most (or least) occurrences in a given event by comparing the other features when there is a specific/known outcome. The use of cross-table frequencies for calculation of correlation scores between pairs of unknown features improves the missing value imputation processing because the technical processing is similar to the processing described above for clustering and finding the suitable clusters. By the use of consistent techniques, the use of cross-table frequencies may improve computer-based prediction using the imputation modeling described herein, as well as streamline the programmatic processing to improve real time computer performance for missing value imputation.

At block 808, the process 800 selects a feature with a highest correlation. The feature with the highest correlation may be the first or next question to be asked for an interactive question/answer session, or may be the first or next question selected from a previously-collected data set.

At block 810, the process 800 ranks the selected feature's correlation scores with other features in descending order. This descending order may be utilized as an ordering of questions for the remaining questions to be asked (interactive) and/or selected (previously-collected data set) to determine an order of features for which missing values are to be imputed.

At block 812, the process 800 selects a question. As described above, for interactive question/answer sessions, the question may be selected and presented to the subject. For a previously-collected data set, the question may be selected from the data set.

At decision point 814, the process 800 makes a determination as to whether the selected question was answered (e.g., either interactively or within the previously-collected data set). In response to determining that the selected question was not answered, the process 800 imputes the missing data value at block 816. Imputation of the missing data value may be performed using the process 700 described above, and as such, the process 700 may be considered integrated into the process 800 or may be called in a real-time interactive manner within a multi-threaded processing environment.

In response to either imputing the missing data value at block 816, or in response to determining at decision point 814 that the selected question was answered, the process 800 makes a determination at decision point 818 as to whether processing of the entire set of questions has been completed. In response to determining that the processing of the entire set of questions has not been completed, the process 800 returns to block 812 and iterates as described above. Alternatively, in response to determining that the processing of the entire set of questions has been completed, the process 800 returns to decision point 802 and iterates as described above.

As such, the process 800 operates in either an interactive question/answer mode or across a previously-collected data set to evaluate which questions to select and process earlier in the processing session to achieve the most accurate results for imputed data values. This processing increases both accuracy and speed with which a more accurate set of imputed data values may be calculated.

Some embodiments of the present invention may improve the technology of computers in one, or more, of the following ways: (i) improving accuracy of missing data value imputation, (ii) improving speed of missing data value imputation, (iii) improving data integrity within systems that rely upon accurate data for proper functionality, and (iv) improving results that are calculated in situations where data that is needed for a particular calculation is not available within an input data set.

The present invention is not abstract because it relates particularly to computer operations and/or hardware for reasons that may include the following: (i) improving computer performance by improving accuracy of missing data value imputation, (ii) improving computer performance by improving speed of missing data value imputation, (iii) improving computer performance by improving data integrity within systems that rely upon accurate data for proper functionality, and (iv) improving computer performance by improving results that are calculated in situations where data that is needed for a particular calculation is not available within an input data set.

As described above in association with FIG. 1 through FIG. 8, the example systems and processes provide missing value imputation using adaptive ordering and clustering analysis. Many other variations and additional activities associated with missing value imputation using adaptive ordering and clustering analysis are possible and all are considered within the scope of the present subject matter.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art based upon the teachings herein without departing from the scope and spirit of the invention. The subject matter was described to explain the principles of the invention and the practical application, and to enable others of ordinary skill in the art to understand the invention for various embodiments with various modifications as are suited to the particular use contemplated.

What is claimed is:

1. A computer-implemented method, comprising:
   by a data collection interface processor that adaptively imputes missing data values based on data clustering responsive to user input via an operatively-coupled user input device:
      receiving, in the user input, data values of an expected input set of data values, where at least one data value of the expected input set of data values is missing from the user input; and
      imputing each of the at least one missing data value by, for each missing data value:
         determining at least one subset of known data with data values similar to at least a subset of the received data values;
         determining, from data values associated with the missing data value within the at least one subset of the known data, a data sample average for the missing data value;
         initializing, using the determined data sample average, an initial estimate of the missing data value;
         identifying, within the at least one subset of the known data, a plurality of boundary data clusters near the initial estimate of the missing data value;
         defining a rectangular data harvesting region encapsulated according to the plurality of boundary data clusters using centroids of coordinates of each of the plurality of boundary data clusters;
         selecting multiple data support clusters within the at least one subset of the known data inside the defined data harvesting region; and
         updating the initial estimate of the missing data value based upon data of the plurality of boundary data clusters and the selected multiple data support clusters.

2. The computer-implemented method of claim 1, further comprising the data collection interface processor updating a confidence interval of the updated estimate of the missing data value.

3. The computer-implemented method of claim 1, further comprising the data collection interface processor determining an order of processing of a plurality of missing data values using one of a random selection and an uncertainty-based selection.

4. The computer-implemented method of claim 1, where the data collection interface processor identifying the plurality of boundary data clusters near the initial estimate of the missing data value is based upon a confidence interval of the initial estimate of the missing data value.

5. The computer-implemented method of claim 1, where the data collection interface processor updating the initial estimate of the missing data value based upon the data of the plurality of boundary data clusters and the selected multiple data support clusters is performed using a programmatic calculation technique selected from a set consisting of a majority vote, an average, a comparison with a population statistic of a specified data type of the missing data value, and a user's choice.

6. The computer-implemented method of claim 1, where the at least one missing data value comprises a plurality of missing data values, and where the data collection interface processor imputing each of the at least one missing data value further comprises the data collection interface processor sequentially ordering imputation of the plurality of missing data values using a next largest uncertainty missing data value selection process.

7. A system, comprising:
   an operatively-coupled user input device; and
   a data collection interface processor that adaptively imputes missing data values based on data clustering responsive to user input via the user input device, the processor being programmed to:
      receive, in the user input, data values of an expected input set of data values, where at least one data value of the expected input set of data values is missing from the user input; and
      impute each of the at least one missing data value by being programmed to, for each missing data value:
         determine at least one subset of known data with data values similar to at least a subset of the received data values;
         determine, from data values associated with the missing data value within the at least one subset of the known data, a data sample average for the missing data value;
         initialize, using the determined data sample average, an initial estimate of the missing data value;

identify, within the at least one subset of the known data, a plurality of boundary data clusters near the initial estimate of the missing data value;

define a rectangular data harvesting region encapsulated according to the plurality of boundary data clusters using centroids of coordinates of each of the plurality of boundary data clusters;

select multiple data support clusters within the at least one subset of the known data inside the defined data harvesting region; and update the initial estimate of the missing data value based upon data of the plurality of boundary data clusters and the selected multiple data support clusters.

8. The system of claim 7, where the processor is further programmed to one of:

update a confidence interval of the updated estimate of the missing data value; or determine an order of processing of a plurality of missing data values using one of a random selection and an uncertainty-based selection.

9. The system of claim 7, where the processor being programmed to identify the plurality of boundary data clusters near the initial estimate of the missing data value is based upon a confidence interval of the initial estimate of the missing data value.

10. The system of claim 7, where the processor being programmed to update the initial estimate of the missing data value based upon the data of the plurality of boundary data clusters and the selected multiple data support clusters is performed using a programmatic calculation technique selected from a set consisting of a majority vote, an average, a comparison with a population statistic of a specified data type of the missing data value, and a user's choice.

11. The system of claim 7, where the at least one missing data value comprises a plurality of missing data values, and where in being programmed to impute each of the at least one missing data value, the processor is further programmed to sequentially order imputation of the plurality of missing data values using a next largest uncertainty missing data value selection process.

12. A computer program product, comprising:

a computer readable storage medium having computer readable program code embodied therewith, where the computer readable storage medium is not a transitory signal per se and where the computer readable program code when executed on a computer adaptively imputes missing data values based on data clustering responsive to user input via an operatively-coupled user input device by causing the computer to:

receive, in the user input, data values of an expected input set of data values, where at least one data value of the expected input set of data values is missing from the user input; and impute each of the at least one missing data value by causing the computer to, for each missing data value:

determine at least one subset of known data with data values similar to at least a subset of the received data values;

determine, from data values associated with the missing data value within the at least one subset of the known data, a data sample average for the missing data value;

initialize, using the determined data sample average, an initial estimate of the missing data value;

identify, within the at least one subset of the known data, a plurality of boundary data clusters the initial estimate of the missing data value;

define a rectangular data harvesting region encapsulated according to the plurality of boundary data clusters using centroids of coordinates of each of the plurality of boundary data clusters;

select multiple data support clusters within the at least one subset of the known data inside the defined data harvesting region; and update the initial estimate of the missing data value based upon data of the plurality of boundary data clusters and the selected multiple data support clusters.

13. The computer program product of claim 12, where the computer readable program code when executed on the computer further causes the computer to update a confidence interval of the updated estimate of the missing data value.

14. The computer program product of claim 12, where the computer readable program code when executed on the computer further causes the computer to determine an order of processing of a plurality of missing data values using one of a random selection and an uncertainty-based selection.

15. The computer program product of claim 12, where causing the computer to identify the plurality of boundary data clusters near the initial estimate of the missing data value is based upon a confidence interval of the initial estimate of the missing data value.

16. The computer program product of claim 12, where causing the computer to update the initial estimate of the missing data value based upon the data of the plurality of boundary data clusters and the selected multiple data support clusters is performed using a programmatic calculation technique selected from a set consisting of a majority vote, an average, a comparison with a population statistic of a specified data type of the missing data value, and a user's choice.

17. The computer program product of claim 12, where the at least one missing data value comprises a plurality of missing data values, and where in causing the computer to impute each of the at least one missing data value, the computer readable program code when executed on the computer further causes the computer to sequentially order imputation of the plurality of missing data values using a next largest uncertainty missing data value selection process.

* * * * *